Figure 4:
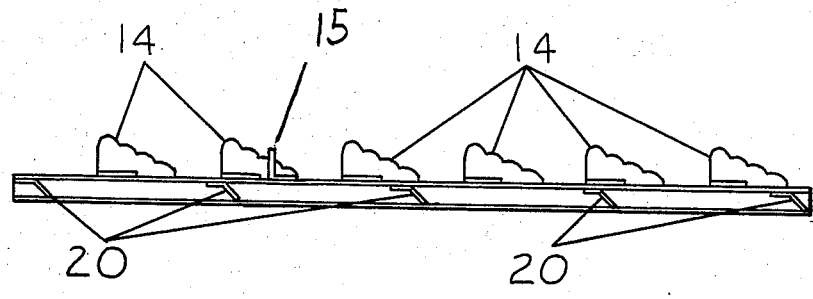

United States Patent [19]

Phillips et al.

[11] Patent Number: 4,548,213
[45] Date of Patent: Oct. 22, 1985

[54] CORN UNIT FOR COMBINE

[76] Inventors: James E. Phillips, Rte. 7, Box 27, Menomonie, Wis. 54751; Jerome J. Cassellius, Downing, Wis. 54734

[21] Appl. No.: 639,940

[22] Filed: Aug. 13, 1984

Related U.S. Application Data

[63] Continuation-in-part of Ser. No. 489,375, Apr. 28, 1983, abandoned.

[51] Int. Cl.⁴ .................. A01F 12/44; B07B 1/04; B07B 1/46
[52] U.S. Cl. ............................ 130/24; 130/27 Z; 209/397
[58] Field of Search ............ 130/24, 27 Q, 27 T, 130/27 Z, 27 E; 209/397, 398, 696

[56] References Cited

U.S. PATENT DOCUMENTS

| | | | |
|---|---|---|---|
| 286,853 | 10/1883 | Scott et al. | 209/397 |
| 290,666 | 12/1883 | Crandle | 209/397 |
| 661,969 | 11/1900 | Fuhr | 130/27.5 |
| 677,857 | 7/1901 | Clement | 209/398 |
| 1,773,914 | 8/1930 | Lunz | 130/24 |
| 1,939,314 | 12/1933 | Neifert et al. | 209/397 |
| 1,965,782 | 7/1934 | Senzek | 130/24 |
| 2,190,262 | 2/1940 | Geist | 130/24 |
| 2,201,083 | 5/1940 | Evenson | 209/397 |
| 2,617,425 | 11/1952 | Dion | 130/24 |
| 3,435,953 | 4/1969 | Schlue, Jr. | 130/26 |
| 3,800,803 | 2/1973 | Rousie | 130/24 |
| 3,982,548 | 9/1976 | Stamp et al. | 130/27.7 |
| 4,230,130 | 10/1980 | Stairt | 130/27 T |

Primary Examiner—Paul J. Hirsch
Attorney, Agent, or Firm—Allan O. Maki

[57] ABSTRACT

A device for converting a conventional combine into a unit which will crush and recover corn cobs as well as recover shelled corn comprising a flat perforated metal element which will replace the conventional chaffer and sieve in the final cleaning mechanism of the combine, the element having a plurality of fins protruding above the upper surface thereof adapted to channel and direct the flow of corn stocks and chaff thereover, the holes being of a size sufficient to allow the passage of corn cob particles therethrough.

5 Claims, 5 Drawing Figures

U.S. Patent   Oct. 22, 1985   Sheet 1 of 2   4,548,213
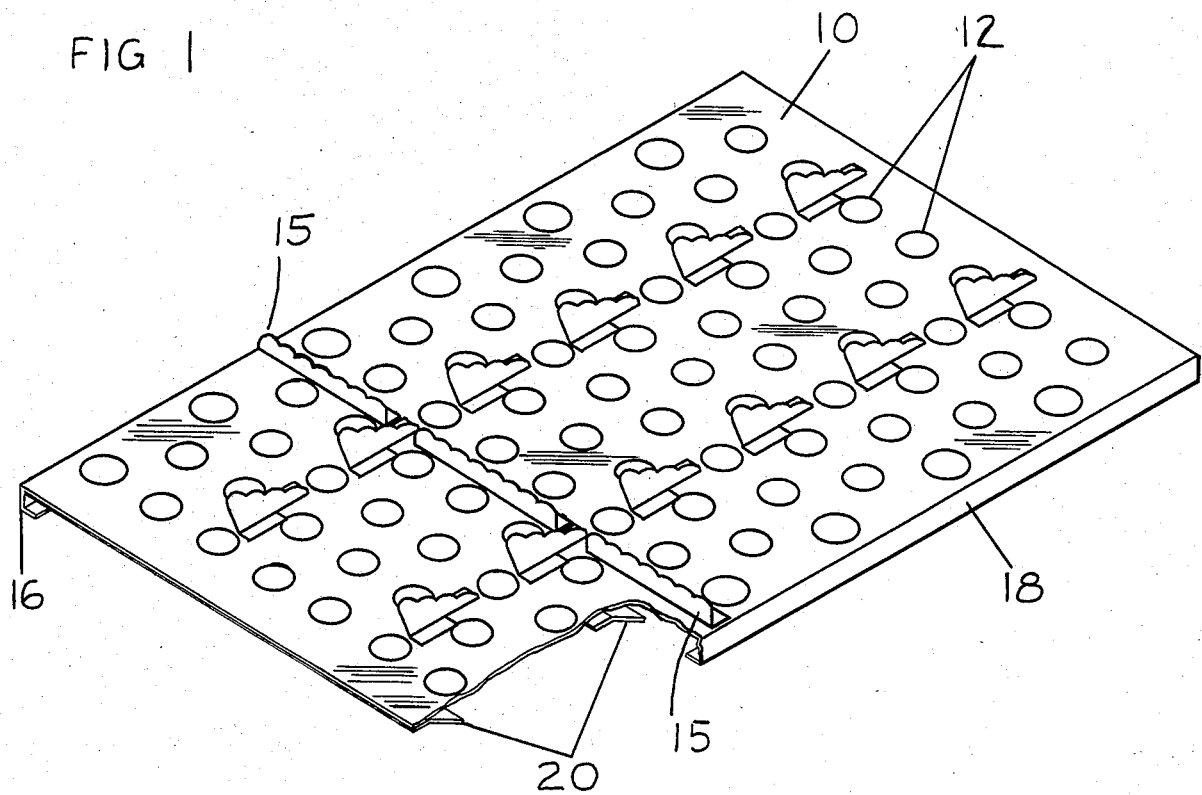
FIG 1
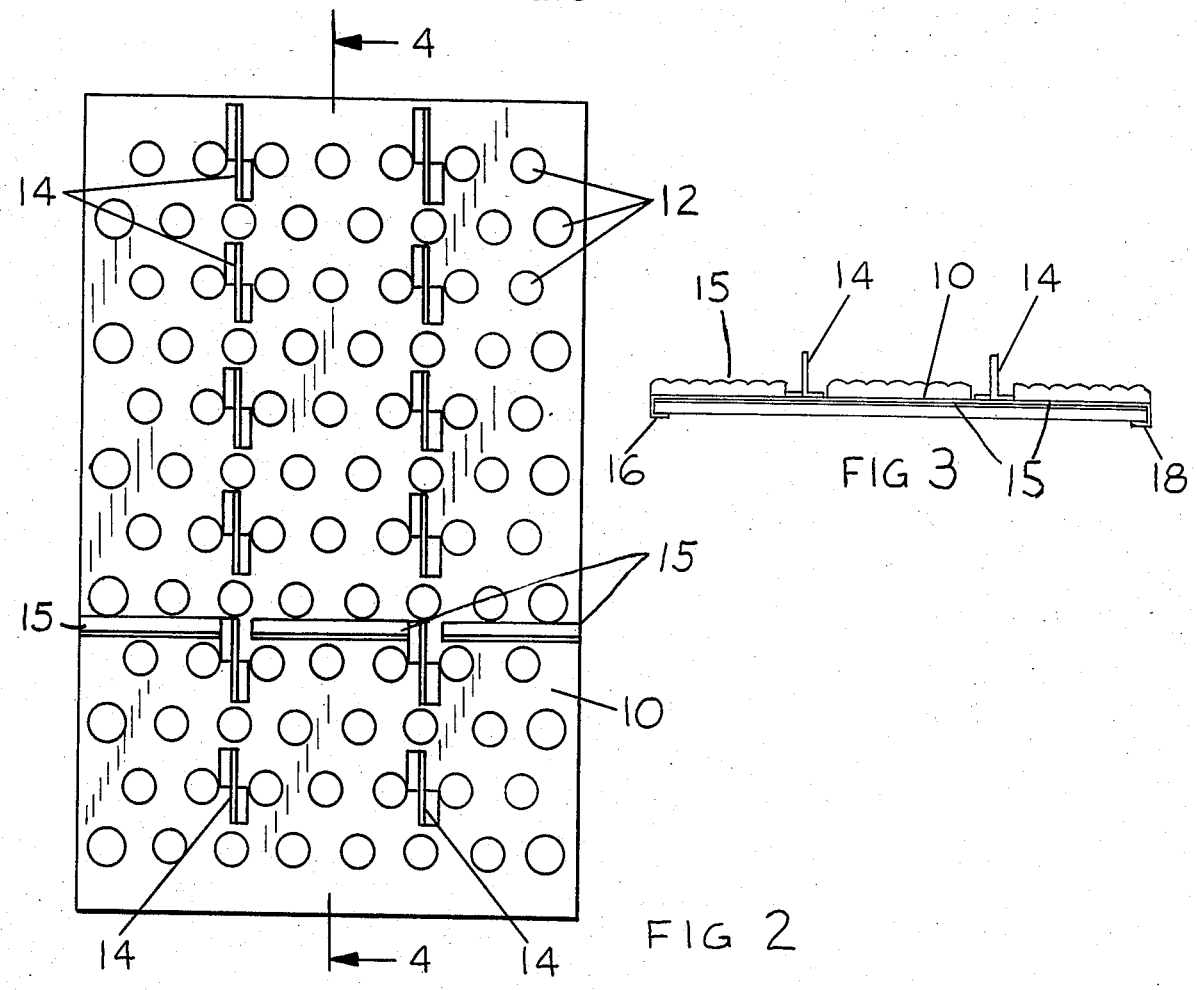
FIG 2
FIG 3

CORN UNIT FOR COMBINE

BACKGROUND OF THE INVENTION

It has been discovered by agricultural scientists that corn cobs are of considerable nutritional value as cattle feed and that the conventional practice of leaving the cobs in the field and harvesting only the kernels of shelled corn results in a loss of at least 20% of the potential nutritional value of the crop. Harvesting of the cobs is a problem, however, because equipment manufacturers have not as of this time designed implements specifically for the purpose of harvesting corn cobs. The present invention provides an inexpensive means for converting a conventional combine so that it will collect cobs along with the corn kernels. By use of the device of the present invention a conventional combine which normally retains the corn and discharge the cob back onto the field is converted into a machine capable of collecting both in the grain tank while the rest of the corn plant and other debris is discharged back onto the field.

An important object of the invention is to replace both the chaffer and sieve from the final cleaning stage of the combine and replace them with an element adapted to harvest corn cobs along with the kernels. Further objects include provision of such elements which are designed to allow the lighter crop residue such as the stocks and leaves of the corn plant to be shaken and blown out the rear of the combine. The preferred embodiment also helps direct the flow of air from the blower fan of the combine improving efficiency and reducing fuel consumption by permitting slower fan and cylinder speeds.

A further object is to replace the chaffer and sieve of units of combine with a flat-surfaced element having numerous perforations therethrough of a size sufficient to permit corn cob particles to fall through said perforations, the element being provided with fins protruding from the upper surfaces thereof to assist and channel the flow of materials thereover and further being provided with reinforcing means including downwardly projecting side members and crosswardly extending ribs across the bottom surface thereof which ribs are preferably equal to direct the flow of air through the element.

Another benefit of the invention is that the amount of voluntary corn growing in the field the following year is curtailed, due to reduction in the amount of corn and cobs with corn left on them is left in the field compared with conventional sieve and chaffer methods. Another advantage is improved fuel efficiency. The concaves are opened up, putting less stress on the combine, and cylinder speed tuned down therefore reducing fuel consumption.

Figure 5:
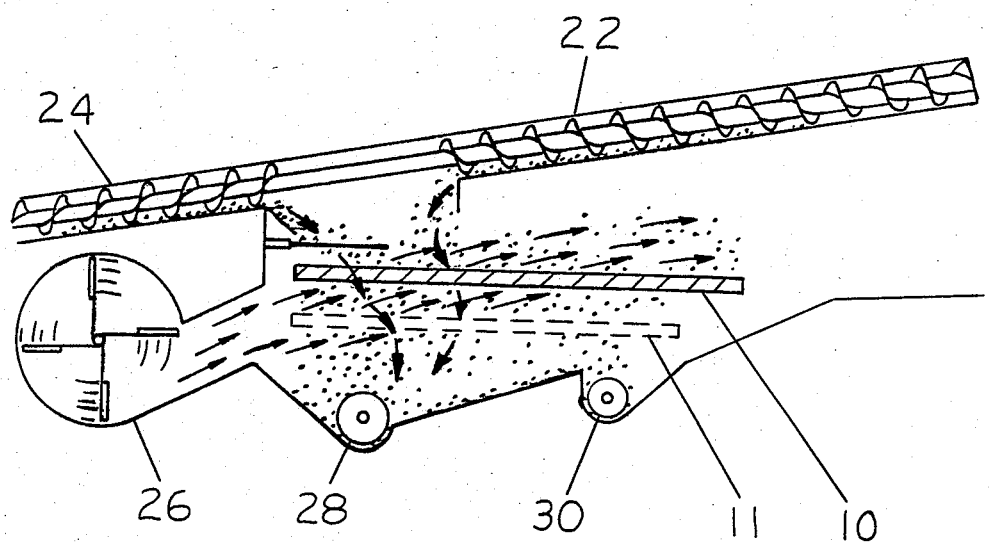

Further objects and advantages of the invention will become apparent by virtue of the following detailed description and accompanying drawings, wherein:

FIG. 1 is a perspective view of the device of this invention with parts cut away, FIG. 2 is a top view thereof, FIG. 3 is an end view thereof, FIG. 4 is a cross-sectional view of the device taken along line 4—4 of FIG. 2, and FIG. 5 is a diagramatic view of the cleaning section of a combine shown to illustrate how the device is utilized.

Referring more specifically to the drawings, there is seen in FIG. 1 element 10 which contains a plurality of holes or perforations 12 located in a staggered relationship across the surface of the element. Staggering of the perforations as shown minimizes the possibility of corn cobs "walking" across the surface of the element without dropping through to a degree such that 98% or greater recovery of the cobs is possible. The upper surface of element 10 is also provided with rows of fins 14. The fins 14 are necessary in order to keep material passing over the element from bunching up and from sliding from side to side. Fins 14 also assist in moving the stocks and trash out the back of the combine. It is desirable to position the fins so that there is a separate channel for materials being discharged onto the element by each of the augers discharging thereon from the primary cleaning unit. Combs or crosswise fins 15 may optionally be provided to improve performance of the unit in usage on hilly ground, as will be explained later in further detail.

Also as is best seen in FIGS. 1 through 3, downwardly projecting side elements 16 and 18 provided at the edges of the element to give the element support and rigidity. Integral with the bottom surface are a series of reinforcing ribs 20 which are welded to the bottom surface of element 10 and to sides 16 and 18. Preferably the ribs are attached at an angle so that the bottom edges thereof are sloped toward the fan. This will tend to catch the air flowing out of the fan and direct it upwardly through perforations 12 so as to blow light pieces of trash away from the cobs as they drop through openings 12. Further, strength can be imparted to the elements by folding or doubling each end under prior to forming the side channels 16 and 18, thereby providing greater rigidity at each end.

In order that perforations 12 accommodate cobs of corn of the conventional hybrid type, the perforations should be approximately 1-$\frac{1}{2}$ to 2-$\frac{1}{2}$ inches in diameter. It has been found that optimum results are achieved with openings approximately 2 inches in diameter. In FIG. 5 the relationship of the parts in the cleaning unit are illustrated. Element 10 of this invention is located in the position normally occupied by the chaffer unit. A combine would conventionally have a screen or sieve 11. However, the sieve is simply removed when element 10 of this invention is employed. Element 10 is simply mounted in the combine in the same manner as the chaffer which it replaced. Augers 22 and 24 feed the partially cleaned corn from the primary threshing unit of a combine and deposit the same on top of element 10. A fan 26 of conventional design causes a steady stream of air to blow through and over element 10 causing lighter debris and plant material to be carried away through the real of the combine. The cobs and corn kernels are deposited into augers 28 and 30. Auger 28 feeds the cleaned material into a grain storage tank and auger 30 returns partially cleaned tailings for another pass through the combine to be cleaned further.

In operation the element 10 of this invention (also referred to as a high moisture corn unit) oscillates down and to the rear and then forward and upwardly, just as did the chaffer which it replaced.

In operation the combine cylinder should be adjusted such that the cobs are broken in about 1 to 3-$\frac{1}{2}$ inch particles.

While the units of this invention may be constructed of any suitable rigid material such as metal, plastic, or composite materials such as fiberglas reinforced resins, the preferred material is 18 to 24 gauge galvanized steel.

As seen in FIGS. 1 through 4, vertical combs 15 may be placed on the surface of element 10. The element performs very well without such combs on level terrain. It has been found, however, that under conditions where hilly terrain is encountered, that such combs are beneficial in assisting the movement of material through the combine without bunching. While only one row of combs is shown, it is usually preferrable to use 3 to 4 rows of such combs. In many applications it is desirable to have the rows of combs placed more densely together to i.e. the use of more rows of combs at the rear of the element than at the front. Such arrangement seems to best facilitate movement of materials through the combine. Whereas the combs are shown in the drawings to be vertical, the same can also be angled toward the rear of the combine, for example at 45°, in order to further assist the flow of air toward the rear of the combine.

While the preferred embodiments of the invention have been described, it should be understood that further embodiments within the scope of the appended claims will be apparent to those with ordinary knowledge of this art.

What is claimed is:

1. An element for separating corn cobs from corn plant debris designed to serve as a replacement for the chaffer unit of a combine comprising
   A. a flat rigid surface having numerous perforations approximately 1-½ and 2-½ inches in diameter therethrough,
   B. said perforations being arranged in staggered relationship to each other and being of a size sufficient to allow passage of broken corn cobs and corn kernels therethrough,
   C. a supporting structure for said surface including side frame members and transverse ribs attached to at least one surface thereof, and
   D. longitudinally aligned fins protruding from the upper surface thereof and being positioned between rows of said perforations.

2. An element according to claim 1 wherein said perforations are of circular shape.

3. An element according to claim 1 wherein said transverse ribs are affixed to the bottom surface of said flat element and at opposite ends to the side frame members and said ribs are inclined with respect to said surface.

4. A cleaning unit for a combine comprising in combination
   A. augers for feeding partially cleaned corn from the primary cleaning unit for said combine,
   B. a blower fan below and in front of said cleaning unit adapted to discharge air upwardly and toward the rear thereof,
   C. at least one auger at the bottom of said unit,
   D. an element positioned to receive material from augers and positioned in the path of said air comprising a flat surface having numerous perforations therethrough said perforations being of a size sufficient to allow passage of broken corn cobs and corn kernels therethrough between approximately 1-½ and 2-½ inches in diameter and a supporting structure for said surface including side frame members and transverse ribs attached to at least one surface thereof and longitudinally aligned fins protruding from the upper surface thereof said fins being positioned between rows of said performations.

5. A unit according to claim 4 wherein said transverse ribs are affixed to the bottom surface of said element and at opposite ends to the side frame members, and said ribs are inclined with respect to said surface.

* * * * *

UNITED STATES PATENT AND TRADEMARK OFFICE
CERTIFICATE OF CORRECTION

PATENT NO. : 4,548,213

DATED : October 22, 1985

INVENTOR(S) : James F. Phillips et al

It is certified that error appears in the above-identified patent and that said Letters Patent is hereby corrected as shown below:

On the title page Item (54) "James E. Phillips" should read -- James F. Phillips --.

Signed and Sealed this

Twenty-first Day of January 1986

[SEAL]

Attest:

Attesting Officer

DONALD J. QUIGG

Commissioner of Patents and Trademarks